June 19, 1956 M. D. NELSON 2,751,520

POWER SUPPLY REGULATION

Filed Aug. 23, 1952 2 Sheets-Sheet 1

INVENTOR
Morris D. Nelson
BY
ATTORNEY

INVENTOR.
Morris D. Nelson
BY Olin A. Mitchell
ATTORNEY

United States Patent Office 2,751,520
Patented June 19, 1956

2,751,520

POWER SUPPLY REGULATION

Morris D. Nelson, New York, N. Y., assignor to Radio Corporation of America, a corporation of Delaware Application August 23, 1952, Serial No. 305,976
14 Claims. (Cl. 315—27)

This invention relates to regulated power supply circuits and more particularly to flyback type high voltage power supply circuits operable from horizontal deflection circuits of a television receiver.

This application is a continuation-in-part of my application Serial No. 279,101, now abandoned, filed March 28, 1952 and titled "Power Supply Regulation."

It has been difficult to effect high voltage regulation in flyback power supply circuits because of the requirements for maintaining a fixed picture size, proper focus, and good deflection linearity. One manner of regulating the supply circuit is to vary an auxiliary means of loading as a function of output potential variation. Since the high voltage circuit derives energy from a deflection output transformer, any variation in loading of the transformer by a regulation control circuit to compensate for variations of output potential must be done in such a manner that the deflection circuits are not caused to misfunction. When the picture tube plus the auxiliary means of loading offer a constant total load, this latter condition is fulfilled.

Although regulation control may be provided when expensive deflection and high voltage circuits are afforded, supplying enough energy that variations in the load will not change the output potential, this is not commercially feasible. Accordingly, it is highly desirable to provide a simple regulation circuit for use with inexpensive flyback power supply circuits operated from the horizontal deflection output transformer.

It is, therefore, an object of the invention to provide improved self-regulating flyback power supply circuits.

Another object of the invention is to provide a regulated power supply circuit particularly adapted for use in television receivers, which provides both constant output potential and proper deflection circuit operation.

A further object of the invention is to provide an inexpensive regulated power supply system usable with commercial deflection output circuits.

There is, therefore, provided in accordance with the present invention a flyback power supply circuit regulated by means causing the deflection output tube to conduct at least during portions of the normally non-conductive flyback periods, thereby providing additional loading to the output transformer in an amplitude proportional to variations of the high voltage power supply output potential. Regulation is, therefore, accomplished by means of a simple sensing control circuit coupled to the power supply circuit for detecting variations of output voltage and therewith controlling the conduction of the output amplifier tube.

A feature of this invention is the provision in the sensing control circuit of facilities for producing a control waveform comprising a series of pulses occurring during flyback periods and varying in amplitude in accordance with output voltage variations. In one illustrative form of the invention, these pulses are derived from the deflection output transformer. In another illustrative form of the invention, these pulses are derived from the deflection wave generator.

Further objects and features of advantage of the invention will be described throughout the following description. For a more clear understanding of the invention and its mode of operation, the following detailed description may be read in connection with the accompanying drawings, in which.

Figure 1:
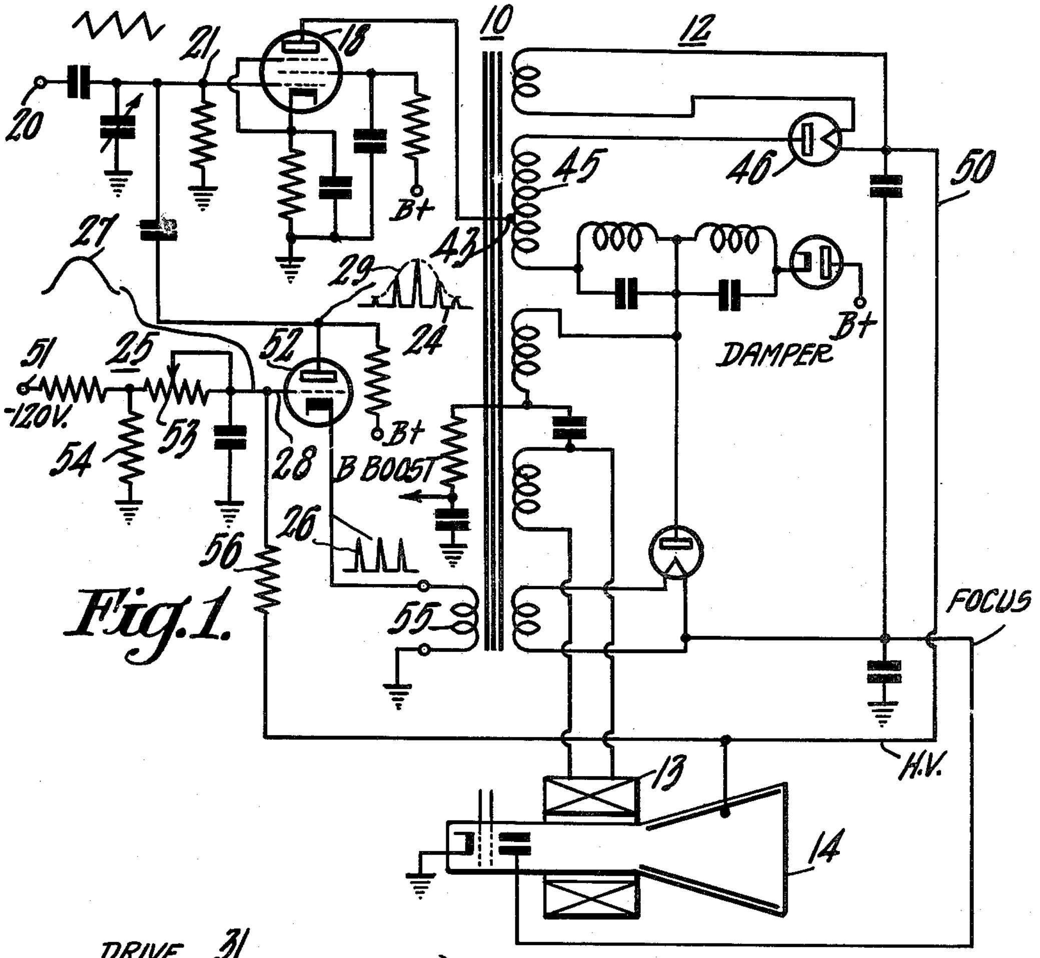
Figure 1 is a schematic circuit diagram of an automatically regulated flyback power supply system embodying the invention.

The deflection output transformer 10 and the flyback power supply circuit 12 connected thereto, together with the corresponding load circuits 13 and 14, may be those circuits found in currently produced television receivers, wherein the deflection load circuit 13 is a magnetic deflection yoke and the flyback power supply load circuit is the kinescope 14.

The deflection output tube 18 operates in a conventional manner to convert the sawtooth input waveform at terminal 20 for use at the load 13 by means including the deflection output transformer 10.

In accordance with the present invention, however, there is supplied at the grid input terminal 21 of the output tube 18, in addition to the usual sawtooth driving potential, a pulsating sensing control potential 24 derived from the sensing control circuit 25. The sensing control circuit itself may comprise any suitable means of combining a pulsating input waveform 26, corresponding, in this illustrative embodiment of the invention, to the flyback pulse obtained from the deflection output transformer 10, and the power supply output voltage variation waveform, arbitrarily designated to have the shape 27 shown at the input lead 28 to the sensing control circuit 25. The combination of the input potentials may be amplified if necessary to provide at the input terminal 21 of the output tube 18 the control waveform 24 having an amplitude modulated envelope 29 representative of the variations 27 of the output voltage in the power supply circuit 12.

No one particular type of sensing control circuit is necessary in accordance with the broader aspects of the invention. It may be of the character of either of the specific types shown and described herein, or other types known in the art, such as those described in the copending United States application of M. D. Nelson, Serial No. 277,827 filed March 21, 1952, now Patent No. 2,726,340, granted December 6, 1955 and titled "Regulated Power Supply Circuits."

Figure 2:
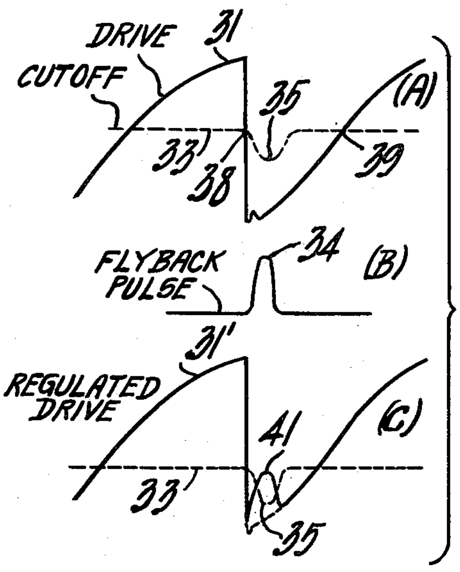
Figure 2 shows waveform diagrams illustrating the manner of operation of the species of the invention shown in Figure 1.

Consider now the waveform diagrams of Figure 2 in connection with the operation of the deflection amplifier tube 18 in supplying a pulsing current for variably loading the deflection output transformer 10 in accordance with variations of potential of the high voltage supply 12. Normal operation curves for the deflection output tube are shown in Figure 2A wherein a sawtooth drive voltage waveform 31 is afforded at the input terminals of the tube. The tube characteristics and deflection circuit operation are such that the output tube will have a cutoff potential designated by the dotted line 33 which, because of the flyback pulse 34 (shown in Figure 2B), developed in the output transformer and thereby connected to the anode of the output tube 18, will have a dip 35 during the flyback period. The cutoff period is designated as the interval in which the tube 18 is cut off during the time elapsed between points 38 and 39 of the deflection waveform 31. During the latter portion of the cutoff period after flyback linear deflection is maintained by operation of a damper tube in a manner conventional and well known in the art.

In accordance with this embodiment of the present invention, however, the output tube 18 is caused to conduct during the flyback period by superimposing a flyback pulse 41 upon the deflection waveform 31' as shown in Figure 2C. The superimposed flyback pulse 41 arrives in coincidence with the dip 35 caused as hereinbefore explained due to increased anode potential. Conduction of the output tube during the flyback pulse time will tend to limit the amplitude of the flyback pulses developed in the output transformer in a manner similar to that obtained when the flyback power supply circuit 12 is operated under full load conditions due to conduction of the high voltage rectifier.

It is noted in this respect, while referring now to Figure 1, that the output tube 18 is connected to a tap 43 of the deflection output transformer winding 45, to which the flyback power supply rectifier 46 is connected at the high potential end. Accordingly, the amount of current effective to cause loading in the portion of winding 45, through which the output tube current flows, will be greater than that drawn by the high voltage rectifier tube 46 because of the step-up turns ratio of the winding.

In Figure 1 the sensing control circuit is operable from variations in either the high voltage output potential at terminal 50 or the variations of the line voltage-operated supply voltage circuit potential at terminal 51. The sensing control amplifier tube 52, therefore, has a pair of input resistors 53 and 54 for developing a control waveform 27 depending upon voltage variations for which the power supply is to be regulated. It, thus, will be understood that such apparatus constitutes a pulse-conditioning means. Features of specific voltage regulation circuits of this nature are described and claimed in my above identified copending application. The flyback input waveform 26 for the sensing control amplifier tube 52 is derived in a separate winding 55 on the output transformer 10 and is connected in the cathode circuit. Such apparatus will be understood to constitute one form of pulse-deriving means. The combined output waveform 24 is, therefore, provided from the sensing control circuit to the input terminal 21 of the deflection output tube 18 to effect regulation in the manner hereinbefore described.

The species of the invention embodied in the apparatus shown in Figure 1 has been found to operate quite successfully except that the size of the scanned raster tends to change with the operation of the regulating apparatus. This, it will be appreciated, is because of the fact that the derivation of the control pulses 26 from the winding 55 of the output transformer 10 is effective to produce the additional operation of the output tube 18 during a substantial portion of the flyback period. Inasmuch as the horizontal deflection apparatus utilizes energy stored in the reactive elements of the deflection circuit by means of the well known "damper" apparatus, the latter apparatus may be deprived of some of the energy needed to produce adequate deflection by the additional operation of the output tube when this operation persists after it has effected the regulation of the high voltage. It, therefore, is seen to be desirable to effect the additional operation of the output tube 18 only for an interval during the first half of the flyback period which is of such time duration that it is effective in regulating the peak of the high voltage pulse, but such that the damper circuits will not be deprived of energy needed to produce substantially uniform deflection.

Figures 3, 4:
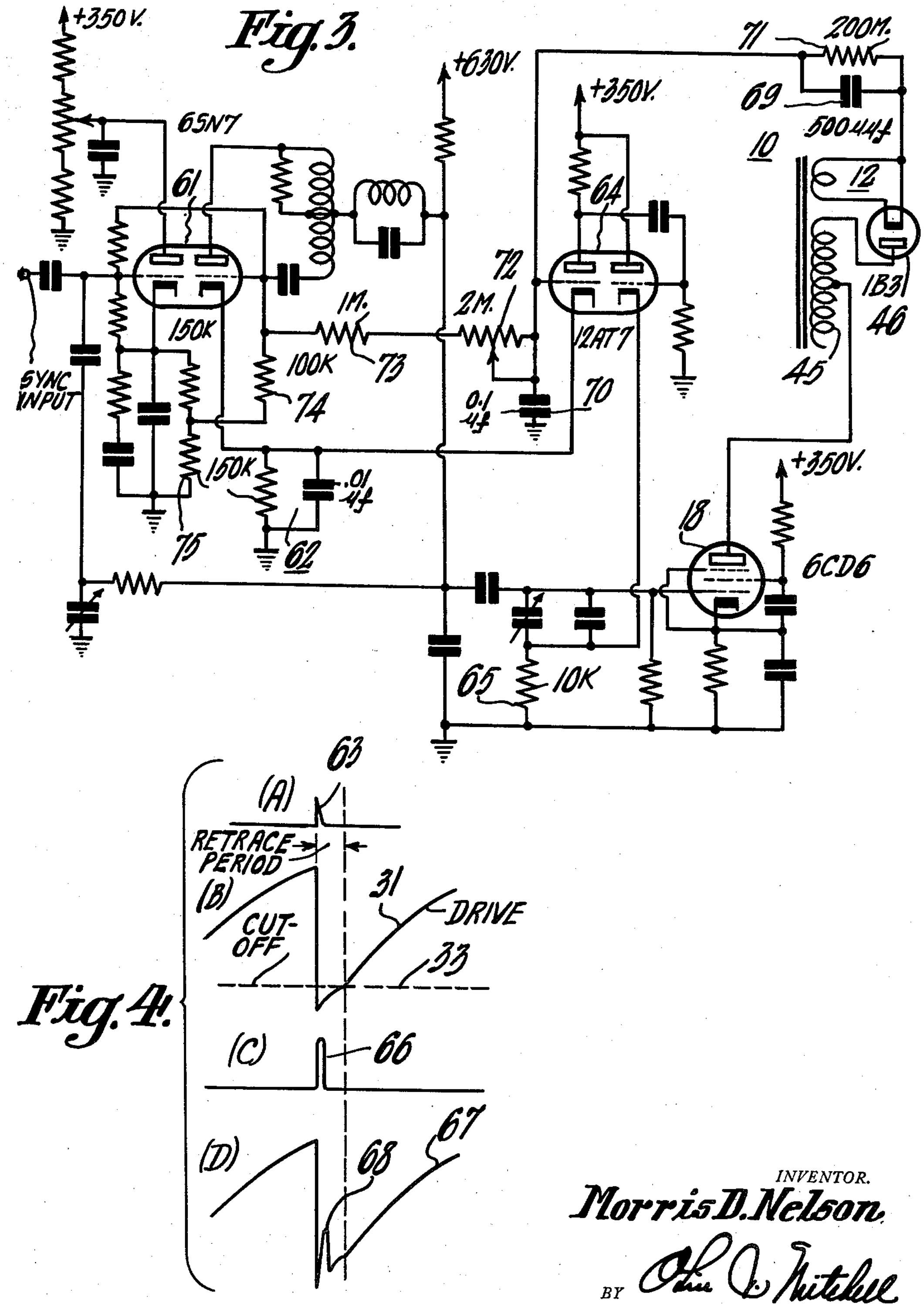
Figure 3 is a schematic circuit diagram of another embodiment of the invention employing a somewhat different type of sensing control circuit.
Figure 4 shows waveform diagrams indicating the mode of operation of the form of the invention shown in Figure 3.

Such apparatus is shown in Figure 3 to which reference now will be made. In this case, the substantially sawtooth driving wave for the output tube 18 is derived from a well-known deflection wave generating circuit known generally as "synchroguide." Such a circuit includes an electron tube 61, the right hand section of which functions as a blocking oscillator. The cathode of the oscillator section of the tube 61, instead of being connected directly to ground as in the conventional arrangements, includes an R-C network 62 which is effective to develop a series of sharp, narrow pulses such as the wave form 63 of Figure 4A. This network, thus, constitutes a pulse-deriving means. It is seen that the leading edge of the pulse 63 occurs substantially simultaneously with the peak of a driving wave 31. Also, the width of the pulse 63 is much less than the indicated retrace period.

In order to increase the amplitude of the developed pulses 63 and to increase the time duration thereof, the network 62 is coupled to a pulse-conditioning means, and more specifically, to the cathode of the left hand section of a dual triode type of electron tube 64. The output or anode electrode of the left hand section of this tube is coupled to the control grid of the right hand section comprising a relatively low impedance cathode follower output stage and including a cathode connected output resistor 65. The conditioned control pulses such as the indicated pulse 66 of Figure 4C, which are produced in the cathode follower output section of the tube 64, are impressed upon the No. 1 or control grid of the output amplifier tube 18, in addition to the substantially sawtooth driving wave 31, thereby forming a composite driving wave 67 by which to control the conduction of the tube 18. It is seen that the composite waveform includes an additional control pulse 68 which is present during the early portion of the retrace period. By means of this additional pulse, the output tube 18 is rendered conducting to effect the desired regulation of the high voltage flyback power supply. The use of the cathode follower for the control pulse injection minimizes any distortion of the driving sawtooth wave.

The amplitude of the additional control pulses 68 is controlled in substantially the same manner as in the embodiment of the invention shown in Figure 1. The control grid of the gating pulse amplifier or left hand section of the tube 64 is coupled to a voltage divider which, in turn, is connected to the power supply circuit 12 so as to render the gating pulse amplifier responsive in proportion to the voltage fluctuations of the flyback power supply circuit.

The voltage divider in this case is, in effect, a composite A.-C. and D.-C. device. The A.-C. responsive portion of the voltage divider includes the usual high voltage filter capacitor 69 and an additional capacitor 70. The D.-C. portion of the voltage divider includes a resistor 71 connected in shunt with the filter capacitor 69 and a series arrangement principally of a variable resistor 72 and a fixed resistor 73, together with the oscillator grid-biasing resistors 74 and 75, effectively connected in shunt with the capacitor 70. By means of such an arrangement, there is formed an attenuator network such that the voltage at the common tapping point of the resistive and capacitive branches of the divider and to which is connected the control grid of the gating pulse amplifier section of the tube 64 is approximately a constant fraction of the voltage from the high voltage rectifier including the diode 46. This increase of voltage is effective for both D.-C. and low and high frequency A.-C. voltage changes in the power supply, thereby increasing the speed with which the regulator acts.

It is also seen that this apparatus is effective to take into account fluctuations in the voltage of the commercial power supply line. This is effected by connecting the voltage divider resistor 73 to the grid of the blocking oscillator section of the synchroguide tube 61. The voltage at this point is subject to variation in correspondence with line voltage fluctuations. This particular feature is also disclosed in the copending Nelson application previously referred to.

There is, therefore, provided by the invention, apparatus for voltage regulation in flyback power supply circuits which utilizes the existing deflection amplifier tube during portions, at least, of the normally inoperative periods in order to afford an effective dummy load control action for regulating purposes. The conductive control of the deflection amplifier tube may be effected in accordance with one illustrative embodiment of the invention by pulses derived from the deflection output transformer, thereby producing an additional operation of the deflection output tube during substantially the entire normally inoperative periods. In accordance with another illustrative embodiment of the invention, the sensing control pulses may be derived from the deflection wave generator, so that after suitable shaping and amplification are effective to control the additional conductive operation of the deflection output tube during only a fractional part of the normally inoperative periods.

Having thus described the construction of the invention and its mode of operation, those features believed descriptive of the nature of the invention are defined with particularity in the appended claims.

What is claimed is:

1. Apparatus for voltage regulation in a flyback type power supply circuit having a deflection output amplifier, comprising sensing control means coupled to said power supply circuit for developing a control potential varying in response to variations of the output voltage of said power supply circuit, and a circuit coupling said sensing control means to said deflection output amplifier to variably control conduction of said output amplifier during the flyback period in response to said control potential, said coupling circuit including a pulse amplifier circuit conductive in response to both flyback pulses in said power supply circuit and potential developed by said sensing control means, whereby said deflection output amplifier conducts during said flyback period in an amount effective to load said power supply circuit to keep the voltage output thereof substantially constant.

2. In a high voltage flyback power supply circuit for television, the combination comprising, a sawtooth deflection wave amplifier device having a conducting period during scanning intervals and a normally non-conducting period during flyback intervals, means for producing pulses, said pulses occurring during said flyback intervals, means coupling said pulse producing means to said deflection wave amplifier device to effect momentary current conduction by said amplifier device during said flyback intervals, a high voltage sensing circuit coupled for response to said power supply circuit for developing a control waveform proportional in amplitude to variations in high voltage, and a circuit coupling said sensing circuit and said amplifier device in a manner to impress said control waveform upon said amplifier device for controlling the magnitude of said current conduction by said amplifier device during said normally non-conducting period as a function of the amplitude of said control waveform.

3. A regulated flyback power supply circuit for television, comprising in combination, a deflection wave amplifier circuit being conducting during scanning periods and normally non-conducting during flyback periods, driving means for said deflection wave amplifier circuit, an output transformer coupled to carry current from said deflection amplifier circuit, means deriving a flyback pulse from said transformer, control means coupling said flyback pulse deriving means to said deflection wave amplifier circuit for supplying a current component from said amplifier circuit to said output transformer corresponding in time to said flyback pulse, and a sensing circuit responsive to output variations in said power supply circuit and coupled to said control means in a manner to control the amplitude of said current component supplied to said transformer as a function of variations in output voltage of said power supply circuit.

4. A voltage regulation system comprising in combination, means supplying a sawtooth deflection waveform, a deflection wave output amplifier device having input terminals coupled to said waveform supplying means, said amplifier being conducting during scanning periods and normally non-conducting during flyback periods, an output transformer coupled to said amplifier device, a deflection load circuit coupled to said transformer, a flyback power supply circuit coupled to said transformer, a sensing control circuit coupled to said power supply circuit to detect variations of output potential of said power supply circuit, a flyback pulse conveying circuit coupled between said transformer and said sensing control circuit, means in said sensing control circuit for providing an output signal comprising pulses derived from said transformer having amplitudes varying in accordance with variations of the output potential of said power supply circuit, and a circuit coupling said sensing control circuit to said deflection wave output amplifier device in such a manner as to apply said output signal to said terminals to effect variable conduction of said deflection wave amplifier device during said flyback periods, thereby loading said transformer to maintain substantially constant output potential level from said power supply circuit.

5. A regulated flyback power supply circuit comprising a deflection wave amplifier having input and output circuits and being conducting during scanning periods and normally non-conducting during flyback periods, driving means coupled to said deflection wave amplifier input circuit, utilization means coupled to said deflection wave amplifier output circuit, means deriving pulses from one of said two first-mentioned means, said pulses occurring during said flyback periods, control means coupling said pulse deriving means to said deflection wave amplifier input circuit to effect momentary current conduction by said amplifier during said flyback periods, and a sensing circuit coupled to said power supply circuit in a manner to be responsive to voltage variations in said power supply circuit and also coupled to said deflection wave amplifier input circuit in such a manner as to control the magnitude of said amplifier current conduction during said flyback periods as a function of voltage variations in said power supply circuit.

6. A regulated flyback power supply circuit comprising, a deflection wave amplifier having input and output circuits and being conducting during scanning periods and normally non-conducting during flyback periods, driving means coupled to said deflection wave amplifier input circuit, said output circuit being coupled to said power supply circuit, means deriving pulses from said driving means, said pulses occurring during said flyback periods, pulse-conditioning means coupled to said pulse-deriving means to produce control pulses during approximately the first half of each of said flyback periods, control means coupling said pulse-conditioning means to said deflection wave amplifier input circuit in such a manner as to impress said conditioned pulses upon said input circuit so as to effect momentary current conduction by said amplifier during said flyback periods, and means responsive to voltage variations in said power supply circuit and coupled to said deflection amplifier input circuit to correspondingly control the magnitude of said momentary current conduction.

7. A regulated flyback power supply circuit comprising, a deflection wave amplifier having input and output circuits and being conducting during scanning periods and normally non-conducting during flyback periods, driving means coupled to said deflection wave amplifier input circuit, utilization means including an output transformer coupled to said deflection wave amplifier output circuit, means coupled to said output transformer for deriving pulses from said utilization circuit, said pulses occurring during said flyback periods, control means coupling said pulse deriving means to said deflection wave amplifier input circuit to effect momentary current conduction by said amplifier during said flyback periods, and a sensing circuit coupled to said power supply circuit in a manner to be responsive to voltage variations in said power supply circuit and also coupled to said deflection wave amplifier input circuit in such a manner as to control the magnitude of said deflection wave amplifier current conduction during said flyback periods as a function of voltage variations in said power supply circuit.

8. A regulated flyback power supply circuit comprising, a deflection wave amplifier having input and output circuits and being conducting during scanning periods and normally non-conducting during flyback periods, driving means including a deflection wave generator coupled to said deflection wave amplifier input circuit, utilization means coupled to said deflection wave amplifier output circuit, means coupled to said deflection wave generator for deriving pulses, said pulses occurring during said flyback periods, control means coupling said pulse deriving means to said deflection wave amplifier input circuit to effect momentary current conduction by said amplifier during said flyback periods, and a sensing circuit coupled to said power supply circuit in a manner to be responsive to voltage variations in said power supply circuit and also coupled to said deflection wave amplifier input circuit in such a manner as to control the magnitude of said deflection wave amplifier current conduction during said flyback periods as a function of voltage variations in said power supply circuit.

9. A regulated flyback power supply circuit comprising, a deflection wave amplifier having input and output circuits and being conducting during scanning periods and normally non-conducting during flyback periods, driving means coupled to said deflection wave amplifier input circuit, utilization means coupled to said deflection wave amplifier output circuit, means deriving pulses from one of said driving and utilization means, said pulses occurring during said flyback periods, control means coupling said pulse deriving means to said deflection wave amplifier input circuit to effect momentary current conduction by said amplifier during said flyback periods, and a sensing circuit coupled to said power supply circuit in a manner to be responsive to voltage variations in said power supply circuit and also coupled to said deflection wave amplifier input circuit in such a manner as to control the magnitude of said deflection wave amplifier current conduction during said flyback periods as a function of voltage variations in said power supply circuit, said sensing circuit including a voltage divider connected to said power supply circuit and having resistive and capacitive branches providing at a common tapping point of said branches a voltage bearing a substantially constant proportionality to the voltage of said power supply circuit for both D.-C. and A.-C. voltage variations, said common tapping point being connected to said deflection wave amplifier input circuit.

10. A regulated flyback power supply circuit comprising, a deflection wave amplifier having input and output circuits and being conducting during scanning periods and normally non-conducting during flyback periods, driving means coupled to said deflection wave amplifier input circuit, utilization means coupled to said deflection wave amplifier output circuit, means deriving pulses from one of said means coupled to said deflection wave amplifier input and output circuits, said pulses occurring during said flyback periods, control means coupling said pulse deriving means to said deflection wave amplifier input circuit to effect momentary current conduction by said amplifier during said flyback periods, a sensing circuit coupled to said power supply circuit and also coupled to said deflection wave amplifier input circuit in such a manner as to control the magnitude of said deflection wave amplifier current conduction during said flyback periods as a function of voltage variations in said power supply circuit, said sensing circuit including a voltage divider connected to said power supply circuit and having resistive and capacitive branches providing at a common tapping point of said branches a voltage bearing a substantially constant proportionality to the voltage of said power supply circuit for both D.-C. and A.-C. voltage variations, a filter capacitor being provided for said power supply circuit, and said filter capacitor being included in the capacitive branch of said voltage divider, said common tapping point being connected to said deflection wave amplifier input circuit.

11. A regulated flyback power supply circuit comprising, a deflection wave amplifier having input and output circuits and being conducting during scanning periods and normally non-conducting during flyback periods, driving means including a deflection wave generator provided with an electron tube coupled to said deflection wave amplifier input circuit, said output circuit being coupled to said power supply circuit, means including a resistive-capacitive network coupled to the cathode of said electron tube for deriving pulses from said driving means, said pulses occurring during said flyback periods, pulse-conditioning means coupled to said pulse-deriving means to produce control pulses during the first half of each of said flyback periods, control means coupling said pulse-conditioning means to said deflection wave amplifier input circuit in such a manner as to impress said conditioned pulses upon said input circuit so as to effect momentary current conduction by said deflection wave amplifier during said flyback periods, and means responsive to voltage variations in said power supply circuit and coupled to said deflection wave amplifier input circuit to correspondingly control the magnitude of said momentary current conduction.

12. A regulated flyback power supply circuit comprising, a deflection wave amplifier having input and output circuits and being conducting during scanning periods and normally non-conducting during flyback periods, driving means coupled to said deflection wave amplifier input circuit, said output circuit being coupled to said power supply circuit, means deriving pulses from said driving means, said pulses occurring during said flyback periods, pulse-conditioning means including an amplifier comprising an electron tube having a cathode input circuit coupled to said pulse-deriving means to produce control pulses during the first half of each of said flyback periods, control means coupling said pulse-conditioning means to said deflection wave amplifier input circuit in such a manner as to impress said conditioned pulses upon said deflection wave amplifier input circuit so as to effect momentary current conduction by said deflection wave amplifier during said flyback periods, and means responsive to voltage variations in said power supply circuit and coupled to said deflection wave amplifier input circuit to correspondingly control the magnitude of said momentary current conduction.

13. A regulated flyback power supply circuit comprising, a deflection wave amplifier having input and output circuits and being conducting during scanning periods and normally non-conducting during flyback periods, driving means coupled to said deflection wave amplifier input circuit, said output circuit being coupled to said power supply circuit, means deriving pulses from said driving means, said pulses occurring during said flyback periods, pulse-conditioning means including an amplifier comprising an electron tube having a cathode input circuit coupled to said pulse-deriving means to produce control pulses during the first half of each of said flyback periods, said pulse-conditioning amplifier being provided with a control circuit having a time constant suitable to effectively prolong said derived pulses, control means coupling said pulse-conditioning means to said deflection wave amplifier input circuit in such a manner as to impress said conditioned pulses upon said deflection wave amplifier input circuit so as to effect momentary current conduction by said deflection wave amplifier during said flyback periods, and means responsive to voltage variations in said power supply circuit and coupled to said deflection wave amplifier input circuit to correspondingly control the magnitude of said momentary current conduction.

14. A regulated flyback power supply circuit comprising, a deflection wave amplifier having input and output circuits and being conducting during scanning periods and normally non-conducting during flyback periods, driving means coupled to said deflection wave amplifier input circuit, said output circuit being coupled to said power supply circuit, means deriving pulses from said driving means, said pulses occurring during said flyback periods, pulse-conditioning means coupled to said pulse-deriving means to produce control pulses during the first half of each of said flyback periods, control means having an input circuit coupled to said pulse-conditioning means and including an electron tube having a relatively low impedance cathode output circuit coupled to said deflection wave amplifier input circuit in such a manner as to impress said conditioned pulses upon said deflection wave amplifier input circuit so as to effect momentary current conduction by said deflection wave variations in said power supply circuit and coupled to said deflection wave amplifier input circuit to correspondingly control the magnitude of said momentary current conduction.

References Cited in the file of this patent

UNITED STATES PATENTS

| | | |
|---|---|---|
| 2,466,784 | Schade | Ar. 12, 1949 |
| 2,523,108 | Friend | Sept. 19, 1950 |
| 2,577,112 | Duke | Dec. 4, 1951 |
| 2,610,298 | Zaloudek | Sept. 9, 1952 |
| 2,621,309 | Faudell | Dec. 9, 1951 |
| 2,627,052 | Helpert et al. | Jan. 27, 1953 |
| 2,697,798 | Schlesinger | Dec. 21, 1954 |

FOREIGN PATENTS

| | | |
|---|---|---|
| 678,156 | Great Britain | Aug. 27, 1952 |